Dec. 18, 1934.  C. L. KNUTSON  1,984,748
TOOL FOR ATTACHING SNAP FASTENERS
Filed March 30, 1933
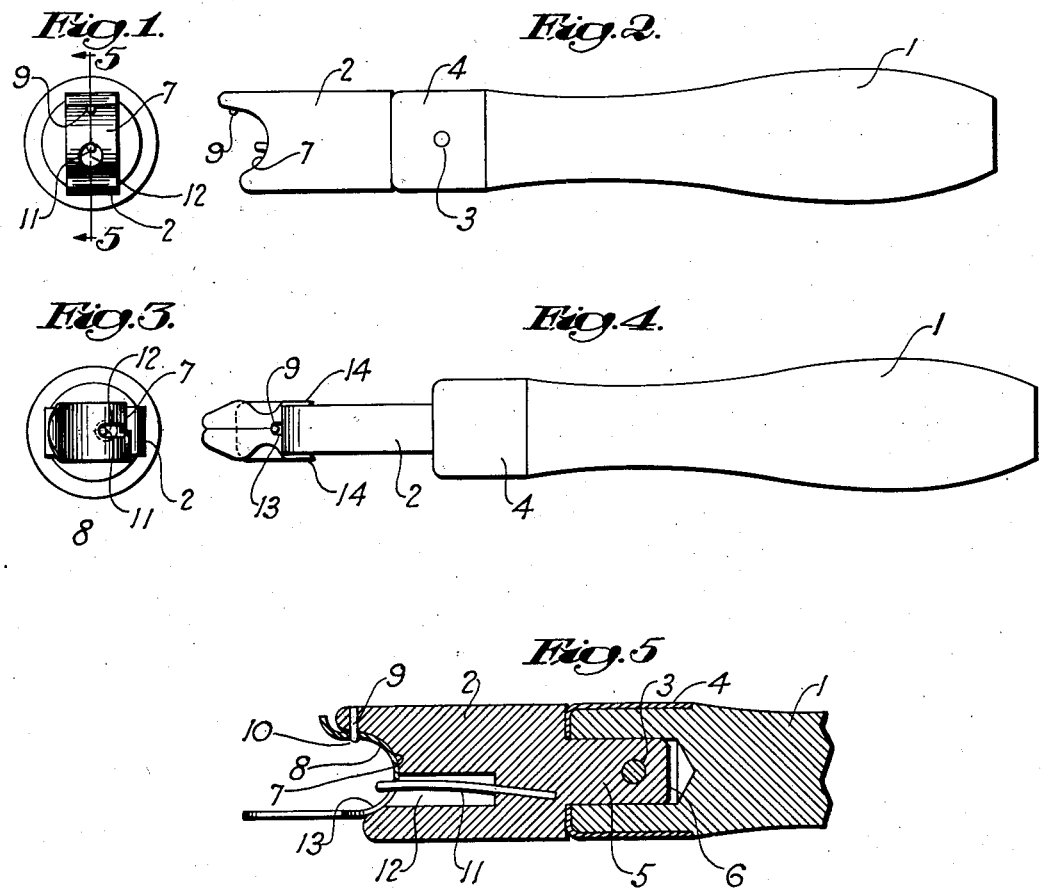
Inventor:
Carl L. Knutson
by Walter S. Jones
Atty.

Patented Dec. 18, 1934

1,984,748

UNITED STATES PATENT OFFICE 1,984,748

TOOL FOR ATTACHING SNAP FASTENERS

Carl L. Knutson, Maywood, Ill., assignor to Cinch Manufacturing Corporation, Chicago, Ill., a corporation of Illinois Application March 30, 1933, Serial No. 663,511

1 Claim. (Cl. 81—3)

My invention aims to provide improvements in tools for attaching snap fasteners.

In the drawing which illustrates a preferred embodiment of my invention:—

Figure 1 is an end elevation of my improved attaching tool;

Fig. 2 is a side elevation of the tool shown in Figure 1;

Fig. 3 is an end elevation of my improved device showing a fastener member held thereby;

Fig. 4 is a plan view of the attaching tool and fastener member illustrated in Fig. 3; and Fig. 5 is an enlarged section of one end of the tool and a fastener member taken on the line 5—5 of Figure 1.

Referring now to the specific embodiment of my invention illustrated by the annexed drawing, I have shown a fastener-holding and attaching tool particularly adapted for use in connection with attaching fastener members like those illustrated and described in United States Letters Patent to Carl L. Knutson No. 1,860,861, issued May 31, 1932.

The particular tool illustrated has a wooden handle 1 to one end of which is secured a fastener-holding part 2 by means of a rivet 3 passing through a ferrule 4, a portion of the wooden handle 1 and a shank 5 extending into a bore 6 in the wooden handle, as best illustrated in Fig. 5.

The fastener-holding part 2 has a curved recess 7 formed in one end thereof to receive the curved portion 8 of a so-called tubing or pipe fastener. The fastener-holding part has a rigid projection or pin 9 extending into the recess 7 and entering a small hole 10 in the fastener, as illustrated in Fig. 5. A relatively long yieldable projection or pin 11 is also anchored in the part 2 and extends throughout the length of a bore 12 and into the recess 7 (Figs. 2 and 5) where it enters an aperture or slot 13 in the fastener member. The yieldable pin 11 extends into the recess 7 at substantially a right angle to the pin 9 and is spaced a substantial distance therefrom.

To attach a fastener to the tool it is merely necessary to enter the curved portion 8 of the fastener into the recess 7 in such a manner that the yieldable pin 11 first enters the slot 13. Then the fastener is slid relative to the recess until the rigid pin 9 snaps into the aperture 10. During this last mentioned part of the operation of attaching, the wall of the fastener at the end of the slot 13 engages the yieldable pin 11 and forces it downwardly from a position shown in Figure 1 to a position shown in Fig. 5 so that when the pin 9 snaps into the aperture 10 the yieldable pin 11 will exert a tension on the fastener member toward the pin 9. In this manner the fastener is firmly held in position by the fastener-holding part 2 against falling directly out of the recess 7. Since the fastener is provided with flaring side edges 14—14 (Fig. 4), they may act as guides during the initial operation of entering the yieldable pin 11 into the slot 13. They also act to prevent relative sidewise movement of the fastener relative to the holding part 2. However, fasteners without flanges 14—14 may be suitably held by my improved holding and attaching tool.

My improved device is simple in construction and operation and is adapted to receive and hold fastener members where there is a certain amount of variation in the distance between the hole 10 and the end of the slot 13 due to the flexibility of the pin 11. Fasteners of the type illustrated require considerable pressure when being attached to a cooperating supporting structure and when attached by hand and without the use of a tool it is a very unpleasant operation for the person attaching them. With my improved device the fastener may be quickly attached to the tool and then entered into an aperture and snapped over a tube, rod, or the like by a straight push exerted upon the handle 1 of the tool. The tool is easily removed by tipping it about the pin 9 as a pivot thereby first releasing the yieldable pin 11.

While I have illustrated and described a preferred embodiment of my invention, I do not wish to be limited thereby, because the scope of my invention is best defined by the following claim.

I claim

A tool for attaching snap fasteners having a handle portion, a fastener-holding end portion provided with a recess to receive a portion of the fastener, a fixed pin extending into said recess at substantially a right angle to the axis of the tool for engagement in an aperture in a portion of a fastener entered into said recess and a yieldable pin extending into said recess on a line about parallel to the axis of the tool for engagement in another aperture in that portion of the fastener which enters the recess, said pins being adapted to hold the fastener in position and the yieldable pin being adapted to adjust itself toward and away from the fixed pin to compensate for differences in the distance between the apertures in the fastener member.

CARL L. KNUTSON.